July 24, 1962  W. L. CARLSON, JR., ETAL  3,045,599
ELECTROMAGNETIC CONDUCTIVE FLUID PUMP
Filed June 8, 1959   2 Sheets-Sheet 2

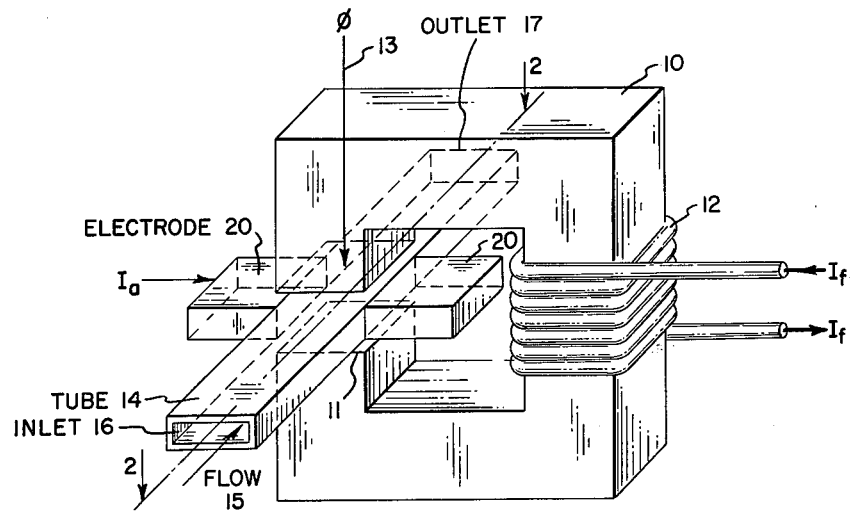
*Fig_1*
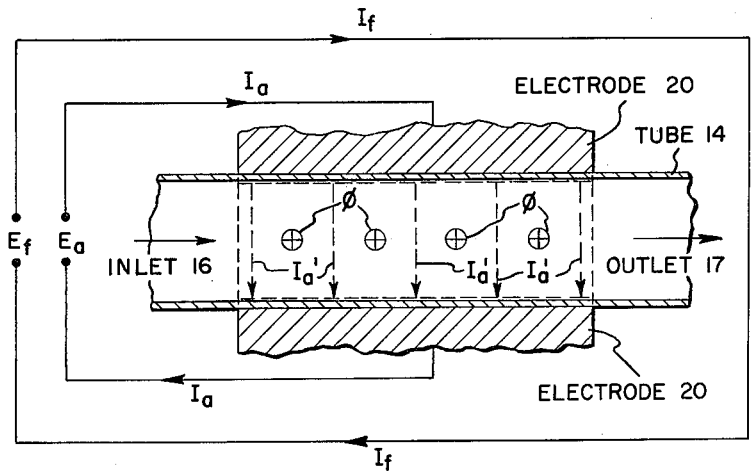
*Fig_2*

INVENTORS
WILLIAM L. CARLSON, JR.
FRANK M. EXNER
BY
ATTORNEY 3,045,599
ELECTROMAGNETIC CONDUCTIVE FLUID PUMP
William L. Carlson, Jr., Bloomington, and Frank M. Exner, Minneapolis, Minn., assignors to Minneapolis-Honeywell Regulator Company, Minneapolis, Minn., a corporation of Delaware
Filed June 8, 1959, Ser. No. 818,764
7 Claims. (Cl. 103—1)

The present invention is directed to a new, improved electromagnetic conductive fluid pump, and more specifically, is directed to a pump structure or method of operation that utilizes the magnetic saturation of part of the pump structure in a manner normally considered undesirable in magnetic devices.

Electromagnetic conductive fluid pumps have been known for many years and for the most part were recognized as laboratory curiosities. In more recent years, it has become desirable and necessary to move conductive liquid metals that are highly corrosive. For this service, the electromagnetic conductive fluid pump became important, as it can be constructed without sealing glands that are normally found in conventional pumping devices. Furthermore, the electromagnetic conductive fluid pump has no moving parts and is therefore ideal for use with corrosive fluids and at high temperatures.

There are broadly two general types of electromagnetic conductive fluid pumps and these are referred to as the conduction type pump and the induction type pump. The presently disclosed arrangement is primarily for use in conduction type pumps and will be described in connection with this type of pump. An electromagnetic conductive fluid pump of the conduction type operates to cause a flow of a conductive fluid by passing an electric current through the fluid at right angles to a magnetic field. The electric current and magnetic field create a pumping force which is mutually perpendicular to the field and current. The force acting on the fluid to produce pumping pressure is analogous to the electromagnetic force acting on the armature conductors of rotating electrical machines to produce torque. Since this is the case, many persons working with the conduction type of electromagnetic conductive fluid pump have applied rotating electrical machinery reasoning to the operation of the pump, and have not recognized an important difference which forms the basis of the present invention.

In operating a conduction type electromagnetic pump, an undesired magnetic field is created. This magnetic field is developed by the electric current that flows through the conductive fluid at right angles to a magnetic field which is provided to perform the pumping function. In some pumps the undesirable magnetic field generated around the electric current path through the device is ignored, and this type of pump is referred to as an uncompensated pump. The lack of compensation in a pump seriously hampers its efficiency, and therefore pumps being manufactured for commercial purposes generally require some form of compensation.

Various means have been provided for compensating for the magnetic field generated around the current flowing through the liquid metal. One of the early methods of compensation is to provide a second current path whereby the pumping current is passed through the duct containing a conductive fluid and then is led back through the magnetic structure by means of a conductor external to the pumping duct. The current is led back in a conductor which is parallel to and adjacent to the current in the conductive fluid and the flow of electric current generates a magnetic field which counteracts the magnetic field in the adjacent conductive fluid. This arrangement is fairly satisfactory in large size pumps where many gallons per minute are desired and the structural space for the lead back conductor is available without creating a space problem. However, a disadvantage of this method of compensation is the additional field excitation required by the larger magnetic gap necessary to accommodate the compensating conductor. In the case of A.-C. pumps the use of a compensating conductor involves further complications in order to avoid excessive eddy current loss. There are various other methods of compensating for this undesirable magnetic field but they become quite complex, expensive, and space consuming.

Due to the fact that an electromagnetic conductive fluid pump appears very similar to a rotating electrical machine, the theory of operation of the pump has been developed along the lines of rotating electrical machinery theory. This theory ordinarily requires that no part of the magnetic structure be saturated and the theory further develops that the maximum pressure available from any uncompensated direct current conductive fluid pump is approximately 150 p.s.i. The same theory states that the amount of pressure available from an uncompensated alternating current conduction type pump is approximately one half of the pressure available from a direct current pump. This theory was developed by one of the foremost experts on electromagnetic conductive fluid pumps and has been commonly accepted as being correct. The acceptance of this theory, however, became questionable when a small alternating current electromagnetic conductive fluid pump was operated at levels above 400 p.s.i. without the usual method of compensation. This pump, that is, the small pump operating at above 400 p.s.i., utilizes a compensation in the form of magnetic saturation of part of the magnetic circuit of the pump. The construction of this type of pump and this method of operation form the basis of the present invention.

It is the primary object of this invention to disclose a new, improved electromagnetic conductive fluid pump that utilizes saturation of part of its magnetic circuit to overcome limitations that have existed in other conductive fluid pumps, at least as to the maximum pumping pressure.

Another object of the present invention is to disclose a simplified construction that magnetically compensates an electromagnetic conductive fluid pump.

A further object of the present invention is to disclose a new, improved electromagnetic conductive fluid pump which requires less field excitation, while generating more pressure than a comparable conventionally compensated pump.

Yet another object is to disclose a method of operating that permits higher pressures to be reached in electromagnetic conductive fluid pumps than have been possible before in practical configurations of "uncompensated" pumps.

Still a further object is to disclose a unique method of operating an electromagnetic conductive fluid pump that has not been contemplated in previously accepted theory.

Another object of the present invention is to disclose a highly simplified method of operation of an electromagnetic conductive fluid pump.

These and other objects will become obvious when a full consideration is made of the present specification and drawings, wherein:

FIGURE 1 is an isometric view of a conventional electromagnetic conductive fluid pump;

FIGURE 2 is a cross-section along lines 2—2 of FIGURE 1 and includes a schematic representation of the fluid, magnetic field, and current paths;

Figure 3:
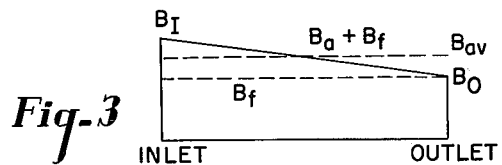
FIGURE 3 is a graph of the variation of the flux across the pumping channel of a typical pump.

At the outset, it is believed that a short discussion of a conventional conductive fluid pump, as shown in FIGURE 1, will aid the concept developed below. While the device disclosed in FIGURE 1 is referred to as an electromagnetic conductive fluid pump, it should be understood that in present-day usage the device is utilized to move fluids such as liquid sodium, liquid sodium-potassium mixtures, liquid potassium, mercury, and even less conductive fluids such as salt water and ionized gases. The most common material currently in use to which this pump is applied is a sodium-potassium mixture often referred to as NaK.

The pump of FIGURE 1 has a C-shaped magnetic structure 10 that has an opening or gap 11. Encircling part of the C-shaped magnetic structure 10 is an energizing coil 12 which generates or excites a magnetic flux as represented at 13 or the symbol $\phi$. The flux 13 is present whenever a current represented as $I_f$ flows in the coil 12. Placed in gap 11 is a tube 14 that can be constructed of any convenient material. In more recent years a high-resistance steel has been utilized whereas in earlier constructions the tube 14 was constructed of a completely electrical insulating type of material such as plastic or glass. In any event, tube 14 carries a flow 15 from inlet 16 to outlet 17. The tube 14 substantially fills the gap 11 in the magnetic circuit 10.

Attached to the sides of tube 14 are two electrodes 20. The electrodes 20 are attached to the sides of tube 14 or penetrate the tube to its inner surface. The electrodes 20 correspond in size to the height of the tube 14 and the length of the gap 11. A current $I_a$ is passed between the electrodes 20 so as to pass through the conductive fluid contained in tube 14.

Under the conditions described above, it will be noted that an electric current passes through a conductive fluid at right angles to a magnetic flux. The combination of the electric current and magnetic flux creates a force in the conductive fluid and moves the fluid along the tube 14 in the direction of flow 15. This basic concept was recognized in the 1850's by Faraday.

In order to more fully understand the problem involved it will be noted that whenever an electric current flows it generates a magnetic flux which is considered to be substantially concentric to the direction of flow of the current. The current $I_a$ generates a magnetic flux which is substantially concentric to the electrodes 20. This magnetic flux interferes with flux 13 and this interference or interaction will be referred to as armature reaction, as it is somewhat comparable to the normal armature reaction found in conventional rotating electrical machinery. In order to provide an efficient pump it is necessary to provide some means to eliminate or compensate for the armature reaction generated by the flow of the current $I_a$. When this is done, a pump is referred to as being a compensated pump as opposed to an uncompensated pump. As mentioned in the introductory material to the present specification, a common means of compensating a pump of the type disclosed in FIGURE 1 is to cause the current $I_a$ to pass between the electrodes 20 and then to lead the current back through the gap 11 in a conductor parallel to electrodes 20. With this arrangement the armature reaction or magnetic flux generated by the current $I_a$ is cancelled. This arrangement, while satisfactory in large size pumps, obviously has the defect of increasing the dimension of gap 11. This increase in a magnetic gap is highly undesirable in all types of magnetic devices as it increases the power necessary to provide the flux. It is also highly undesirable from a space standpoint when exceedingly small, high pressure pumps are being designed and built.

As previously stated, the accepted theory of operation of electromagnetic conductive fluid pumps has indicated that a limit of 150 p.s.i. exists for an uncompensated pump. In order to fully understand the present invention a complete discussion of the theory that claims a limitation of 150 p.s.i. is needed and will be undertaken prior to disclosing the discrepancy in the theory and the resulting invention contained herein. The explanation of the accepted limitation on pressure rise is that operating with flux densities below saturation sets a limit to the permissible armature current of the device. This can be easily shown, but the changes in the relationship of flux to current which occur when saturation sets in are not so easy to analyze. They depend on the configuration of the magnetic structure or circuit. To help clarify the train of thought involved, it may be well to consider the relationship without considering saturation, as has been done in published literature, and then with saturation so that the novel concept can be understood more fully.

In the ideal conduction type of electromagnetic conductive fluid pump, the magnetic field structure is assumed to have infinite permeability, so that all of the magnetomotive forces are absorbed in a magnetic potential drop across the gap. The mathematical expression for the pressure rise, based on this assumption, obtained for the ideal pump has no meaning after saturation of the magnetic circuit sets in. This is the essence of the fallacy in the conclusions drawn as to the possible output of real pumps. In FIGURE 2 a discussion of a stalled direct current type pump will be undertaken and this discussion will be expressed relative to flux density for an ideal pump. In FIGURE 2, a cross section of the pump disclosed in FIGURE 1 is found wherein electrodes 20 are shown bordering the sides of the tube 14. The flux $\phi$ or 13 is disclosed in a conventional representation by the crossed circles. The conductive fluid in the tube 14 constitutes the armature of the presently disclosed fluid flow electrical machine. The magnetic circuit, through the gap, is completed by an infinitely permeable yoke, not shown. This yoke would correspond to the C-shaped magnetic structure 10 and for the present explanation can be considered as having infinite permeability. The magnetic path length through the gap perpendicular to the drawing will be designated as $l_B$. The current generating the magnetic field is designated as $I_f$ and the armature current is designated as $I_a$. The armature current $I_a$ can be considered as uniformly distributed along the face of electrodes 20 as is represented by current elements $I_a'$. The summation of all of the $I_a'$ equals the armature current $I_a$.

In any magnetic path passing through a gap and around an infinitely permeable yoke, the magnetomotive force $$\frac{4\pi I}{10}$$

resulting from a current I linking this path will be equal to the magnetic potential drop along the path where it crosses the gap. This is $Hl_B$ where H is the magnetic field strength in the gap and $l_B$ is the length of the gap in the direction of the flux. If the conventional formulas for a magnetic circuit are utilized and the permeability of air is considered approximately equal to that of a vacuum, the following formula for flux density B results:

$$B = \mu H = \left(\frac{4\pi}{10}\right)\left(\frac{I}{l_B}\right) \quad (\mu=1) \quad (1)$$

Considering the magnetic paths across the gap at the inlet and outlet ends, it is possible to write the magnetic density at these ends as being respectively $B_I$ (magnetic flux density at the inlet) and $B_O$ (the magnetic flux density at the outlet). These formulas become:

$$B_I = \left(\frac{4\pi}{10}\right)\left(\frac{I_f + I_a}{l_B}\right) \quad (2)$$

$$B_O = \left(\frac{4\pi}{10}\right)\left(\frac{I_f}{l_B}\right) \quad (3)$$

Since in the direct current pump the current is uniformly distributed along the gap, FIGURE 3 shows the linear variation of the magnetic flux density B along the entire length of the gap. The pressure rise in an ideal pump is normally expressed as:

$$P = \frac{I_a B_{av}}{l_B}$$

where $B_{av}$ is the average flux density along the gap and $l_B$ is the magnetic path length across the gap. From the Equations 2 and 3, the following formula results:

$$I_a = \frac{10 l_B}{4\pi}(B_I - B_O) \quad (4)$$

and it also follows, since B varies linearly along the gap, that:

$$B_{av} = \frac{1}{2}(B_I + B_O) \quad (5)$$

By combining the formulas set out above, it is possible to write an expression for the pressure which is:

$$P = \frac{10}{8\pi}(B_I^2 - B_O^2) \quad (6)$$

It is seen that for any arbitrary value of $B_I$ the pressure is largest for $B_O = 0$. This is because $B_I - B_O$ is a measure of the armature current as shown by Equation 4. It is further to be noted that to have $B_O = 0$ requires that $I_f = 0$ by Equation 3, in other words, no field excitation. On the basis of Equation 6 and the arbitrary limit of about 16000 gauss for $B_I$, the statement about the limiting pressure rise has gained current acceptance. Based on these values and the Formula 6

$$P = \frac{10}{8\pi}(16000^2 - 0^2) = 1.0 \times 10^7 \text{ dynes/cm.}^2 = 150 \text{ p.s.i.}$$

To see the fallacy in this conclusion, notice that Equation 6 depends on Equation 4, which says that armature current is strictly limited by the allowed maximum flux density. But this is true only for the ideal case of an infinitely permeable return path for the air gap flux. When saturation occurs in a ferromagnetic return path, its permeability falls and part of the magnetomotive force around any path through the gap is absorbed by the magnetic potential drop in the ferromagnetic portion of the path B can no longer be expressed in terms of $l_B$ alone as in Equation 1. Equation 4 becomes entirely invalid and Equation 6, therefore, loses all meaning. In particular, there is now no reason to omit field excitation. To avoid the supposed limitation of performance based on the fallacious interpretation of Equation 6, it is common practice to neutralize the reaction of the armature on the field by providing compensating conductors in the gap through which the armature current doubles back on itself and returns to the generator without linking the magnetic structure of the pump. Disadvantages of this method have been discussed and will be further compared with the newly developed compensation method presently disclosed.

When saturation in the ferromagnetic return path is taken into account, the possible flux patterns are much harder to analyze. The easiest approach is to examine two extreme cases, depending on which parts of the return path are allowed to saturate. In the first case, low reluctance pole pieces are connected by a saturated yoke. In the second, saturation is restricted to pole pieces immediately adjacent to the gap, connected by a low reluctance yoke. The first case represents the wrong use of saturation but will be described in order to bring out more vividly the essential features of the correct mehod. Also, it may be that visualizing saturation effects in this way may have contributed generally to the avoidance of saturation. This is suggested in the literature by the phrase "demagnetizing effect of $I_a$" and reflects the point at which accepted theory apparently has been incorrect.

Figure 4:
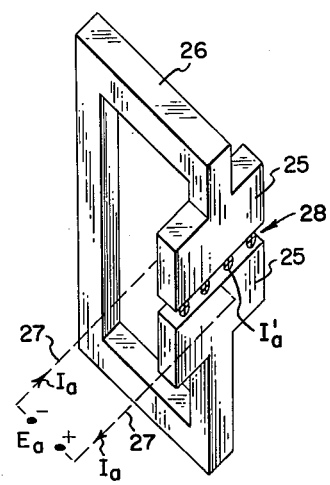
FIGURE 4 is a schematic representation of a pump wherein the outer magnetic circuit approaches the case where the circuit is completely removed.

The first extreme case considered is represented by the magnetic structure shown in FIGURE 4. This structure consists of low reluctance pole pieces 25 connected by a saturated narrow yoke 26. A voltage source $E_a$ supplies armature current $I_a$ by means of conductors 27. Current $I_a$ is distributed uniformly along the gap in current elements $I_a'$ represented by crossed circles 28.

Figure 5:
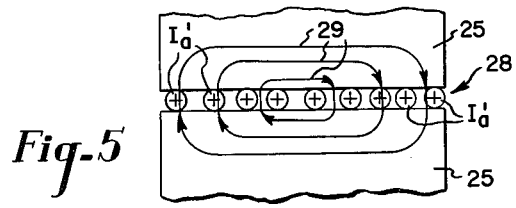
FIGURE 5 is a schematic representation of the current and flux relationship in a pump of the type disclosed in FIGURE 4.
Figure 6:
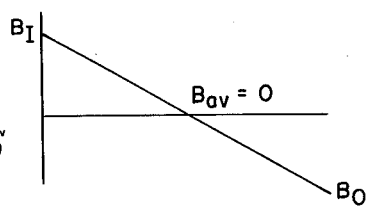
FIGURE 6 is a graphical representation of the resultant flux pattern of the distribution disclosed in FIGURE 5.

Consider first a limiting form of this configuration in which the yoke 26 is removed entirely. In this case the only available flux paths must cross the gap twice as shown in FIGURE 5. The flux lines 29 form a concentric pattern around the current lines $I_a'$. In the limiting case of FIGURE 4 where the yoke 26 is narrowed to nothing, the resultant magnetic flux density is represented by FIGURE 6. In this case the flux density $B_I$ or inlet density varies from a positive extreme value to $B_O$ or outlet density which is an equal and opposite negative value. This results in the flux density having an average value equal to 0. With an average value of 0 for the flux density in the pumping device, no output is obtained.

Figure 7:
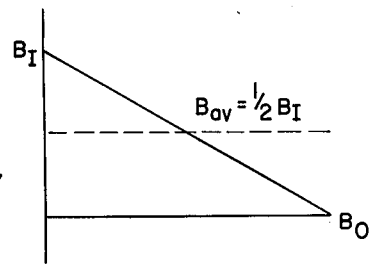
FIGURE 7 is a graphical representation of the flux in an ideal pump.

The opposite limit to the configuration of FIGURE 4 is reached by increasing yoke cross section or permeability so as to reach essentially zero reluctance. All paths through the gap now find a short circuit return through the yoke. Each such path links a fraction of the armature current $I_a$ 27 proportional to its distance from the right-hand end of the gap. Since the extreme left-hand path, which links the whole of $I_a$ now crosses the gap only once instead of twice as in FIGURE 5, the left-hand, or inlet end of flux density $B_I$, is twice the value shown in FIGURE 6. $B_O$ at the right-hand end is zero since a path here links no current. FIGURE 7 shows graphically the resulting flux density distribution in the absence of field excitation. The magnetic flux density in this case has an average value of half of $B_I$. It will be noted that FIGURE 7 is the same as the armature excited portion of FIGURE 3.

Figure 8:
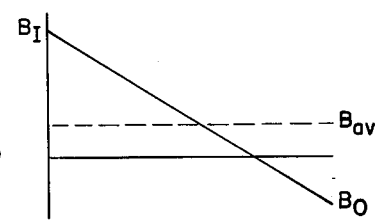
FIGURE 8 is a graphical representation of the flux in a typical pump which approaches an ideal condition.

Returning now to the magnetic circuit represented in FIGURE 4, it is clear that the saturated yoke allows only part of the flux to follow paths which cross the gap only once. The resulting distribution of flux density in the gap is intermediate between those shown in FIGURES 6 and 7 for yokes with infinite and zero reluctance respectively. FIGURE 8 represents such an intermediate distribution for the case of finite yoke reluctance with low reluctance pole pieces.

It is now well to digress to notice that the ideal pattern of FIGURE 7 can be thought of as the resultant of two components. One is the symmetrical pattern of FIGURE 6, which does no pumping. The other is a useful average component $B_{av}$ which can be thought of as excited by a one-half turn of the armature current. It is noted that a full turn of the armature current would give a uniform field equal to the field at the left end of FIGURE 7, where the magnetomotive force of the whole armature current is effective across the gap. It should also be noted that the symmetrical pattern of FIGURES 5 and 6 is really another way of looking at the relationship expressed by Equation 4.

It is clear that the saturation of a yoke such as disclosed in FIGURE 4 does just the wrong thing. The symmetrical flux component which produces no pumping effect is undisturbed, but the useful flux excited by the half turn effect of armature current and by the field ampere turns is impeded. The second extreme case of flux configuration in the pump structure is embodied by saturated pole pieces connected by a low reluctance yoke. In this arrangement the effects of saturation as disclosed in FIGURES 4 through 8 are largely reversed. This in fact is the basis of the present invention. It is now desirable to look at the heart of the present invention which is embodied by saturating pole pieces of the unit, so arranged as to spread the resulting flux into an unsaturated yoke.

Figure 9:
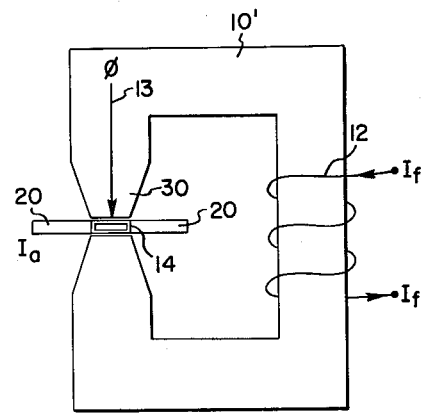
FIGURE 9 is a disclosure of the improved and novel pump disclosed and claimed in the present application.

The present invention can be disclosed most conveniently by showing a magnetic circuit having tapered pole pieces as disclosed in FIGURE 9 at 30. The tapered pole pieces 30 are shown on a C-shaped magnetic structure 10' which corresponds to the magnetic structure 10 of FIGURE 1. It should be further noted that it is not necessary to taper the pole pieces 30 as shown in FIGURE 9 to practice the present invention, it is only necessary to provide pole pieces 30 which can be saturated while the balance of the magnetic circuit 10' is not saturated. The simplest arrangement is in the tapered pole pieces 30 but the desired result could be accomplished by changes in the material utilized in the pole pieces as opposed to the balance of the magnetic circuit 10'. This could also be accomplished by pole pieces that are stepped in configuration or have parts of the pole piece, for example, drilled away.

In considering the effect of the present invention, it will be noted that a magnetic flux density B that is beyond the knee of the conventional saturation curve can be obtained in the pole tip iron by means of the field current $I_f$ alone. In FIGURE 9 if $I_f$ is applied to winding 12 a magnetic flux 13 can be obtained. It will be noted that the flux 13 can more easily saturate the pole tips 30 due to the reduced cross section of the magnetic circuit. Thus, if the current $I_f$ is increased to a point where the pole pieces 30 are saturating the flux 13 in the balance of the circuit can be maintained near, but below, the saturation level of the magnetic material. If this is done, armature current $I_a$, applied through the electrodes 20 can excite little additional flux in the pole tips 30, since they are already approaching saturation. As a result, armature reaction is largely eliminated, and furthermore most of the residual effect is derived from the useful component explained in connection with FIGURE 7 for the case of a low reluctance yoke. More specifically, the present arrangement provides for a means of compensating an electromagnetic conductive fluid pump merely by properly constructing the magnetic circuit as opposed to utilizing various external compensating methods. In so doing, it is possible to build a compact unit which is no larger in physical size than that of a completely uncompensated pump and it is further possible to operate the pump over a wide range of armature current without the effectiveness of the compensation being substantially reduced.

Figure 10:
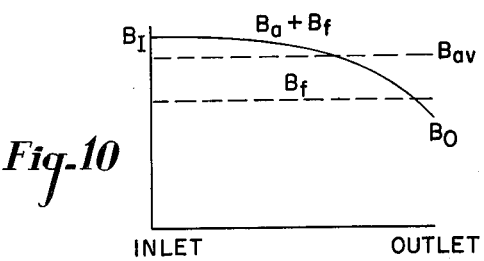
FIGURE 10 is a representation of the magnetic flux in the circuit of the pump disclosed in FIGURE 9.

In looking into this matter further it can be seen that in the present invention the low reluctance yoke provides flux paths which cross the gap only once as explained in connection with FIGURES 4 and 7. Now, however, the magnetomotive force of the armature current is largely absorbed in the pole tip iron, which becomes highly saturated except near the outlet end, where the flux lines link no armature current. The resultant field can be visualized as in FIGURE 10, where $B_f$ is the field produced by the field armature turns alone or $I_f$. The resultant curve is the magnetic flux density established by the combined effect of the armature and field currents together. On the assumption of zero yoke reluctance the curve $B_a+B_f$ will never go below the component $B_f$ but in practice the curve $B_a+B_f$ passes slightly below this level as the reluctance of the main yoke of the circuit cannot be entirely neglected. This can be compared in some respects to the curve disclosed in FIGURE 8.

The embodiment disclosed above shows the preferred arrangement utilized in constructing and operating a conductive fluid pump under the present invention. In effect, this arrangement can be referred to as "compensation by magnetic saturation." This arrangement has many advantages, including the fact that no compensating conductors are needed. This eases the problems of fluid channel design, which are exceedingly difficult in small sized pumps. Since in this method the gap separation $l_B$ is not increased to accommodate a neutralizing conductor, fewer field ampere turns of field excitation are required. In conventionally compensated pumps the armature excitation is wasted instead of giving useful average densities as are disclosed in FIGURES 9 and 10. The present arrangement is also desirable in that the eddy current losses incurred in compensating conductors in the conventional alternating current pump are avoided.

While the present invention has been disclosed in its preferred embodiment, the applicants wish to be limited in scope of their invention only by the appended claims. There are other means of obtaining the saturation of the pole tips of a pump and all of these arrangements are contemplated within the present invention.

We claim as our invention:

1. In an electromagnetic liquid metal pump: a passage filled with a liquid metal; electrical conductors and current generating means passing a current across said passage through said liquid metal at a location between said conductors; a magnetic core adjacent said passage and including flux exciting means passing a magnetic flux across said passage mutually perpendicular to said current and said passage; said flux exciting means being limited in capacity to a level of flux excitation below the saturation of the magnetic core; and said core further having poles which are different in magnetic reluctance than said core adjacent said location between said conductors along said passage and said poles being substantially magnetically saturated when said flux in the balance of said core is below saturation density; said saturated poles substantially eliminating the excitation of any magnetic flux in said passage and said liquid metal by the flow of said current in said electrical conductors and said liquid metal.

2. In an electromagnetic liquid metal pump: passage means filled with a liquid metal; current generating and distributing means passing a current across said passage means through said liquid metal: magnetic core means adjacent said passage means and including flux generating means passing a magnetic flux across said passage means mutually perpendicular to said current and said passage means; said flux generating means being limited in capacity to a level of flux generation below the saturation of the magnetic core means; and magnetic pole means which are different in magnetic reluctance than said core means being substantially magnetically saturated when said flux in the balance of said core means is below saturation density; said saturated pole means substantially eliminating the generation of any magnetic flux in said liquid metal by the passage of said current in said liquid metal.

3. In an electromagnetic conductive fluid device: passage means filled with a conductive fluid; current generating and distributing means passing a current across said passage means through said conductive fluid; magnetic core means adjacent said passage means and including flux exciting means passing a magnetic flux across said passage means perpendicular to said current; said flux exciting means being limited in capacity to a level of flux excitation below the saturation of the magnetic core means; and magnetic pole means which are different in magnetic reluctance than said core means being substantially magnetically saturated when said flux in the balance of said core means is below saturation density; said saturated pole means substantially eliminating the excitation of any magnetic flux in said conductive fluid by the passage of said current in said conductive fluid.

4. The method of operation of an electromagnetic liquid metal pump wherein a liquid metal is caused to flow in a conduit by an electric current being conducted through the liquid metal and a magnetic circuit having excitation means creating a magnetic field in the conduit mutually perpendicular to the current flow and to the flow of the liquid metal, which method comprises conducting said electric current through the conduit, exciting the magnetic field in the magnetic circuit to saturate the magnetic circuit in the proximity of the conduit while the balance of the magnetic circuit is unsaturated, and thereby substantially exclude the excitation of a second magnetic field in the magnetic circuit by the electric current passing through the liquid metal.

5. The method of operation of an electromagnetic liquid metal pump wherein a liquid metal is caused to flow in a conduit by an electric current passing through the liquid and a magnetic circuit having generator means creating a magnetic field angularly disposed to the direction of current flow and to the direction of flow of the liquid, which method comprises passing the electric current through the liquid; generating the magnetic field in the magnetic circuit to substantially saturate the magnetic circuit in the proximity of the conduit while the balance of the magnetic circuit is unsaturated, and thereby substantially exclude the generation of a second magnetic field in the magnetic circuit by the electric current passing through the liquid.

6. The method of operation of an electromagnetic conductive fluid pump wherein a conductive fluid is caused to flow in a conduit by an electric current passing through the fluid and a magnetic circuit having generator means creating a magnetic field angularly disposed to the direction of current flow and to the direction of flow of the fluid, which method comprises generating the magnetic field in the magnetic circuit to substantially saturate the magnetic circuit in the proximity of the conduit while the balance of the magnetic circuit is unsaturated, and thereby substantially exclude the generation of a second magnetic field in the magnetic circuit by the electric current passing through the fluid.

7. The method of operation of an electromagnetic conductive fluid device having a magnetic circuit including a gap susceptible of magnetization by flux excitation means associated with the circuit and by an electric current passing through the gap in the circuit, which method comprises operating the flux exciting means to saturate the magnetic circuit in the area of the gap in the circuit while the balance of the magnetic circuit is unsaturated and thereby substantially exclude the excitation of a flux in the magnetic circuit by passing the electric current through the gap.

References Cited in the file of this patent
UNITED STATES PATENTS

| | | |
|---|---|---|
| 330,451 | Weston | Nov. 17, 1885 |
| 2,434,705 | Lago | Jan. 20, 1948 |
| 2,655,107 | Godbold | Oct. 13, 1953 |
| 2,787,219 | Werner | Apr. 2, 1957 |